Oct. 11, 1927.

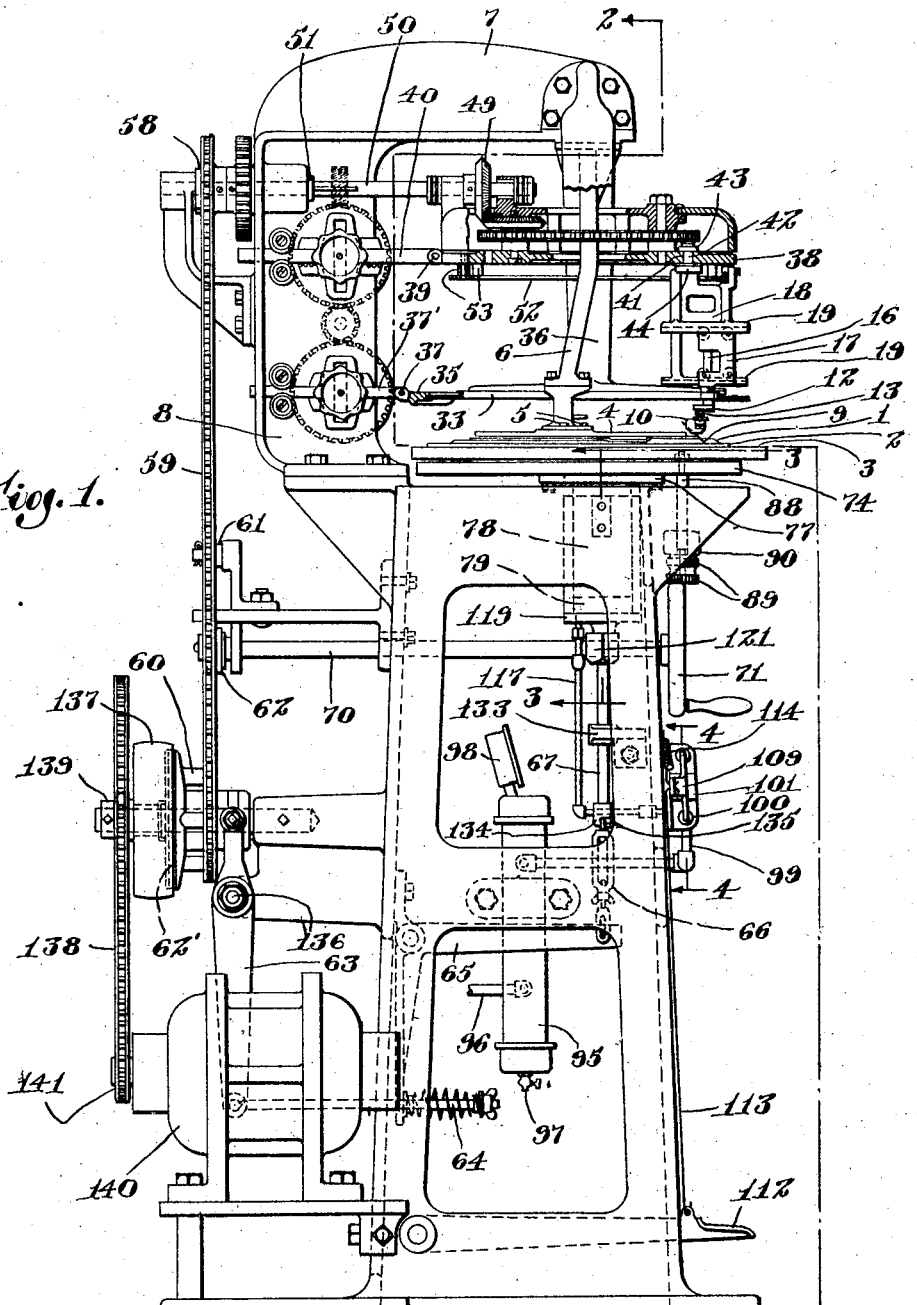

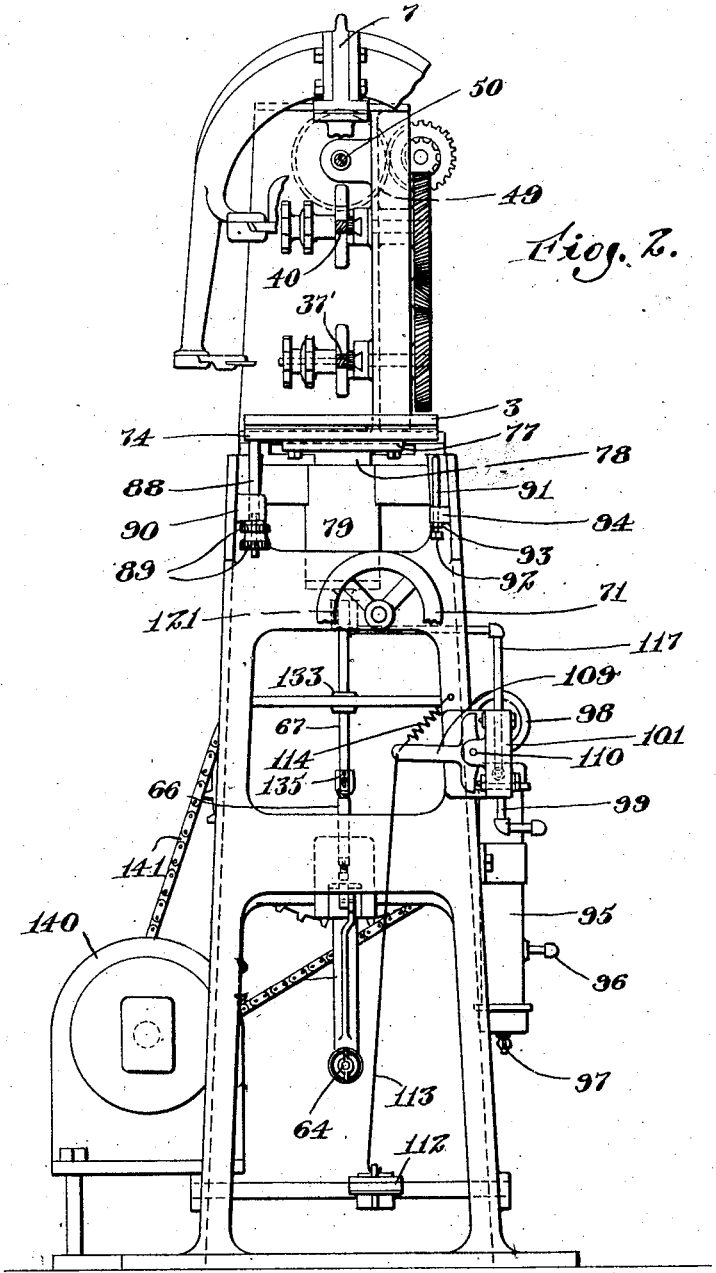

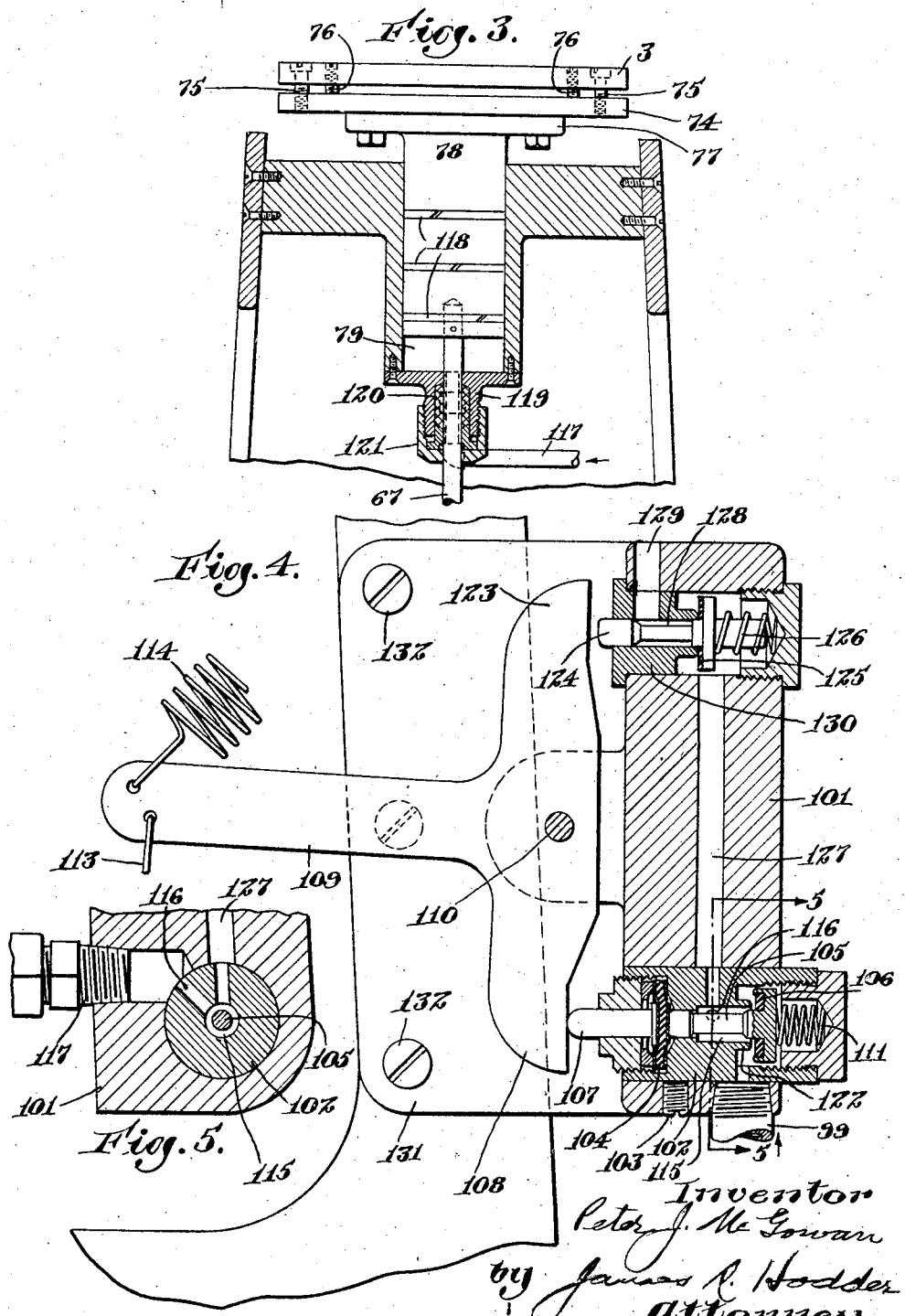

P. J. McGOWAN 1,645,441

SOLE CUTTING MACHINE

Filed May 11, 1926

Inventor
Peter J. McGowan
by James R. Hodder
Attorney

Patented Oct. 11, 1927.

1,645,441

UNITED STATES PATENT OFFICE.

PETER J. McGOWAN, OF HYDE PARK, MASSACHUSETTS, ASSIGNOR TO WELLMAN COMPANY, OF MEDFORD, MASSACHUSETTS, A CORPORATION OF MAINE.

SOLE-CUTTING MACHINE.

Application filed May 11, 1926. Serial No. 108,212.

My present invention relates primarily to sole cutting machines, and is particularly adaptable to machines of the type illustrated in prior patents to E. L. Patten, No. 1,144,429, June 29, 1915; No. 1,270,319, June 25, 1918; and No. 1,418,604, June 6, 1922.

In the machine illustrated and described in the above noted prior patents, the quality of the work produced, and the results obtained depended largely on the strength and endurance of the operator. This was due to the fact that even in the machine illustrated in Patent No. 1,418,604, the work table, carrying the cutting sheet and the material to be cut, had to be raised by the pressure of the operator's foot against the table-lifting treadle. Since this table weighs in the vicinity of sixty pounds, it will be apparent that the continuous operation of such a machine would soon tire an average operator beyond the point of efficient operation, and that only an extraordinarily strong person could be capable of sustained operation. Added to the weight of the work-table being lifted is the fact that a separate treadle, even though connected to the table lifting treadle by a "kick-off", also had to be operated by the foot of the operator to engage the friction clutch to set the cutting knife, carriage, etc., in operation. Thus the tightness of fit of the material to be cut, against the leader and form, depended entirely on the pressure which the operator exerted on the foot treadle. Frequently toward the end of the day, when tiring, insufficient pressure would be applied, resulting in slippage of the work, and consequent loss of material, time and profit.

A principal object of my present invention, therefore, is to simplify the operation of such prior machines, and to increase their efficiency and output. To carry out this desirable object I utilize but a single foot treadle with no direct mechanical linkage to the work table or the friction clutch. This foot treadle is connected to an air valve, which operates on the slightest pressure on the foot treadle, and permits the entrance of air, through suitable tubes or pipe lines, to an air-actuated piston to which the work table is connected. Attached to the piston tail rod, and disconnectable therefrom is a turnbuckle, which in turn operates, through a series of links and levers, the friction clutch for operating the knife carriage, cutting knife, etc. Upon releasing the foot treadle, the air is immediately exhausted through the exhaust port of the air valve, the piston and work table drop to normal position and simultaneously disengage the clutch and cease the operation of the cutting knife.

I utilize but a single foot treadle in my invention, and the present machine is operable upon such slight pressure that girls can run the machine, and be assured of as efficient operation, and as firm cooperation between the table, cutting form and leader, at the end of the day, as at the beginning, thus greatly increasing the output of the machine and the quality of the soles produced.

I believe that such a machine, constructed and arranged as above explained is novel, and wish to claim the same herein.

I believe that my arrangement of air valve and operating means is novel, and I wish to claim this feature herein also.

A further feature of my present invention is a novel and improved means for preventing tilting or sideplay of the knife carrying means during operation.

A still further feature of my present invention consists in the provision of novel adjustable means for holding the knife carriage on the guide track during operation of the knife. In the prior machine the roll attached to the knife carriage and riding on the guide track, also engaged the fixed head of the machine, resulting in wearing of the under face of the head and also caused a frictional resistance on the roll. In my present improvement I utilize a pair of rolls, one roll riding on the top of the guide track and the other roll bearing against the under surface of the guide track. Each of these rolls is attached to the knife carriage by adjustable means, which permits ready adjustment of the rolls against each side of the guide track and insures smooth, even movement of the knife carriage on the guide track.

Further features of the invention, details, novel combinations of parts and advantages, will be hereinafter more fully pointed out and claimed.

Referring to the drawings, illustrating a preferred embodiment of the invention, Fig. 1 is a side elevation of the completely assembled machine;

Fig. 2 is a front elevation, partly in section, on the line 2—2 of Fig. 1;

Fig. 3 is a sectional detail on the line 3—3 of Fig. 1, illustrating the air actuated piston.

Fig. 4 is a cross-sectional detail of the air valve mechanism on the line 4—4 of Fig. 1;

Figure 6:
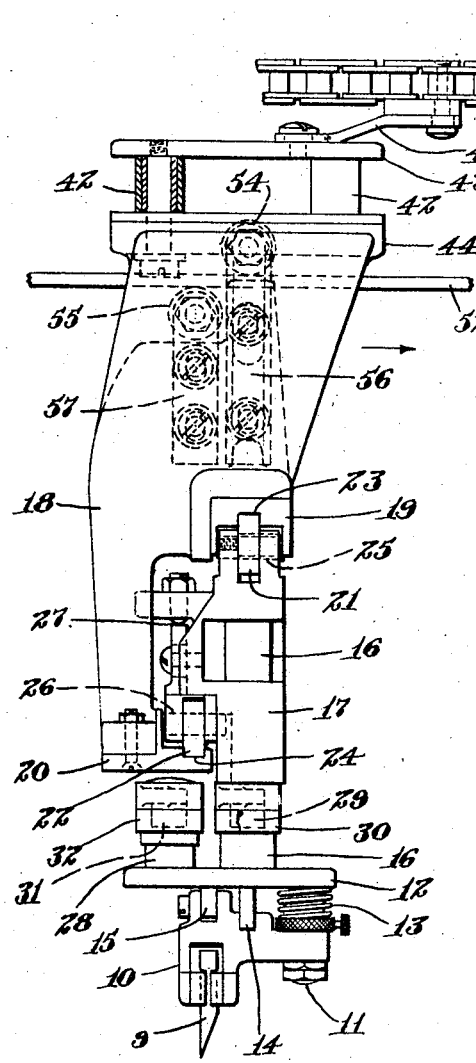

Fig. 5 being a cross-sectional detail of the valve on the line 5—5 of Fig. 4;

Fig. 6 is a detail illustrating the knife carriage and knife holding block; and

Figure 7:
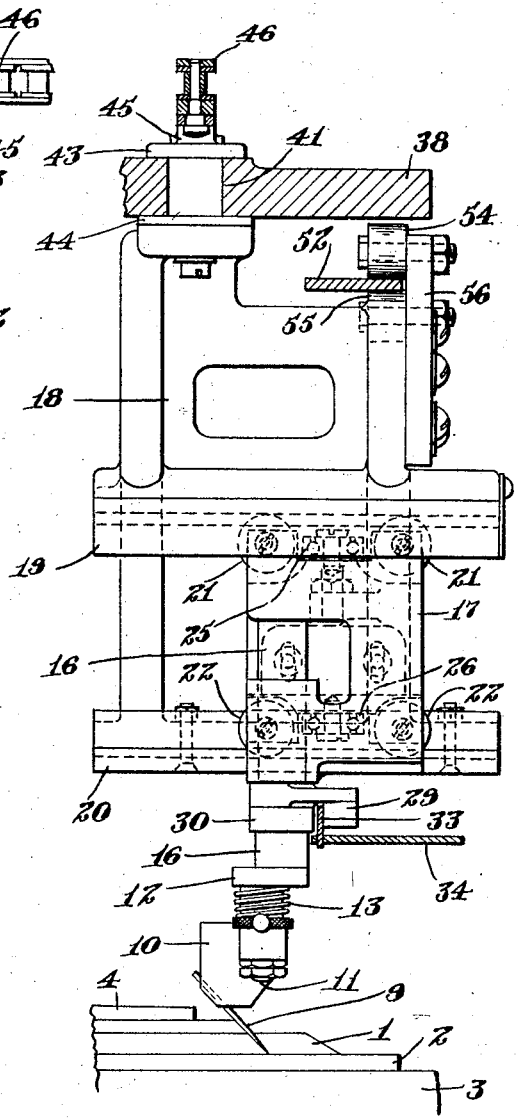

Fig. 7 is a side view of the construction illustrated in Fig. 6.

The machine illustrated in the drawings is of the general construction and arrangement shown in Patten Patents Nos. 1,270,319 and 1,418,604, above enumerated, and reference is hereby made thereto for a full understanding of any details of construction that are not herein sufficiently made clear.

As shown in the drawings, sheet material 1 on a cutting sheet 2 supported on a work-table 3 is held against a form 4 detachably or otherwise secured, as indicated at 5, to a bracket arm 6 which is attached to an overhanging portion 7 of a frame indicated generally at 8. A knife 9 is adapted to be moved around the form closely adjacent to its periphery. The knife 9 is removably secured to an arm 10 pivoted on the pin 11, which is carried by a plate 12, and a coiled spring 13 normally forces the knife toward the stop 14. Above the knife 9 an anti-friction roll 15 is mounted to take care of lateral strain resulting from the inclined cutting position of the knife. The plate 12 is fixed to the lower end of a spindle 16, which is confined against endwise movement but rotatable in a carriage 16 slidably supported by a truck 18 provided with guideways 19 and 20. In order to provide for freer movement and sliding of the carriage 17 in the guideways 19 and 20, I provide the carriage 17 with rolls 21 and 22, there being two of each of these rolls, which slide respectively in grooves 23 and 24, and also provide the carriage with horizontal ball bearing rolls 25 and 26, which bear against the side walls of the guideways 19 and 20, respectively. This construction allows the body of the carriage proper within said guideways to be made smaller, and allows the rolls 25 and 26 to prevent side play of the carriage 17 in its guideways. This is an important feature and greatly increases the life of the carriage. I also provide means, clearly illustrated at 27, for compensating for wear of the rolls 21 and 22.

The plate 12 to one side of the spindle 16 carries an upright pin 28. On the spindle 16 and pin 28 pairs of anti-friction rolls 29 and 30, and 31 and 32, are supported in spaced relation to embrace a sinuous flange 33 of a leader 34, which is removably supported in a leader carrier 35, slidably sustained on the bottom of the arm 36 depending from the frame section 7. The leader carrier is pinned at 37 to a pitman 37' which must be operated by an adjustable crank pin of the construction fully disclosed in prior Patten Patent No. 1,270,319, above noted.

Above the leader is a second shiftable member or head 38 which is pinned at 39 to a pitman 40 that is adapted to be reciprocated by an adjustable crank pin as more fully disclosed in said prior Patent 1,207,319. The shiftable head 38 is provided with an endless groove 41 and in this groove is mounted a pair of anti-friction rolls 42 operatively connected to the truck 18 and confined between the plates 43 and 44, the latter of which is preferably integral with the truck 18, see Fig. 7. The upper plate 43 is connected by a link 45 to an endless chain 46 engaging suitable sprocket wheels, one of which is driven through bevel gearing 49 which in turn is operated by a shaft 50 driven through a sleeve 51 constituting the main shaft of the machine.

On the shiftable head 38 and under and encircling the endless groove 41 is positioned an endless plate, strip or track 52, which is bolted to the shiftable head 38 in a fixed spaced relation determined by the blocks 53. The track 52 constitutes a guideway for anti-friction rolls 54 and 55 carried by the truck 18. The roll 54 rides on the top of the track 52 and the roll 55 rides on the underneath side of the track 52, these rolls being preferably offset from each other to allow for adjusting means 56 and 57. By these adjusting means 56 and 57, any wear in the track or rolls can be readily compensated for, keeping the rolls at all times in a close rolling contact with the track 52 and thus preventing tilting of the truck 18 from its normal upright working position.

The construction above described is an improvement over the prior Patten machines, since the roll 54 no longer contacts with the head 38, and thus the friction caused by such a double contact of the roll, viz, with the head 38 and track 52, is greatly reduced. The adjusting means 56 and 57 also add to the efficiency of the machine, since the adjustment of the rolls 54 and 55 enables them to be kept close to the track, and the adjusting means are simple and easily operable.

It will be understood that when the main shaft 51 is driven, that the truck 18 is carried around the endless groove 41 and that while it moves in this predetermined path, the knife 9 is dragged around with it, and describes a path determined by the sinuous flange 33 of the leader plate which is engaged by the opposed pairs of friction rolls 29 and 30, 31 and 32.

The throw of the leader carrier is varied, as well as the throw of the shiftable head 38, in substantially the same manner, as described in prior Patents 1,270,319 and 1,418,604, and need not be herein further described.

The coil spring 13 which yieldingly urges the arm 10 against the form 4 and toward the stop 14 permits the knife to yield instead of cutting into the form 4 when vibration during the operation of the machine carries the knife 9 against the form.

The main shaft 51 of the machine carries a sprocket wheel 58 which is rotated by a chain 59 in engagement with an adjustable idler 61 and a one-way clutch 62, and encircling a sprocket fixed to the driven member 60 of a friction clutch 61 between whose component parts is interposed a disk of cork or the like 62' to insure a sufficient friction for driving the machine but permitting lost motion if a jam should occur during the operation of the machine. The driven member 60 of the clutch is shiftable through a lever 63, yieldable link 64, and bell-crank lever 65, which bellcrank lever 65 is connected, through a turn-buckle 66, to a piston tail rod 67.

The one way clutch 62 is described in detail in Patten Patent 1,418,604, and I will not elaborate on the same herein. This one way clutch is connected through a shaft 70 to a hand crank 71 located at the front of the machine within convenient reach of the operator, which hand crank 71 is utilized by the operator when it is desired, for any purpose, to actuate the knife and carrier by hand.

The one way clutch is so arranged that when the machine is driven by power the clutch will be inoperative, thus avoiding unnecessary operation of the shaft 70 and hand crank 71.

The work table, Figs. 1 and 3, comprises the main table 3 and auxiliary table 74, the latter being adjustably secured to the former by a number of clamp screws 75 and set screws 76 at predetermined spaced points for permitting the upper surface of the table 3 to be positioned in uniformity with the lower surface of the form 4. The auxiliary table 74 is bolted to the head 77 of a piston 78 vertically reciprocable in a cylinder 79.

The worktable has its limit of upward movement determined by a stop bolt 88 with adjustable lock nuts 89, the bolt passing through a lug 90 fixed to the frame and being fixed to the auxiliary table 74. The limit of downward movement of the work table is determined by a stop screw 91 adjusted through the head 92 and clamped by the nut 93 against the apertured boss 94.

My novel air-controlled structure for the operation of the present machine will now be described. The air enters an air chamber 95 through a supply line 96 from any suitable source. The chamber 95 is provided with a pet cock 97 for cleaning, and with an air gauge 98 so that the operator is informed at all times as to the air pressure available. The air passes from the chamber 95 through the line 99 to an inlet valve 100 in the main valve body 101. This inlet valve 100 is normally in closed position, preventing the entrance of any air thereto. In Figs. 4 and 5, this inlet valve is clearly illustrated, comprising a body 102 which is securely held in the main body 101 by a set screw 103. This inlet valve is provided with a rubber diaphragm 104 with a double flanged metal center, as shown, and has a rubber valve stem 105 with a rubber seat 106. On the opposite side of the diaphragm from the valve stem 105, is a plunger 107, which, in Fig. 4, is illustrated as forced inwardly by the arm 108 of a T-lever 109 pivoted at 110. When the plunger 107 is in the position shown in Fig. 4, the valve stem 105 is opened against the pressure of the coiled spring 111. The arm 108 has been placed in its present position by pressure on the foot treadle 112, a wire or rod 113 connecting the foot treadle 112 and the T-lever 109. The T-lever 109 has been pulled downwardly against the tension of the coiled spring 114. With the inlet valve open, as in Fig. 4, upon pressure on the foot treadle 112, the air will pass from the pipe or tube 99 to the chamber 115, thence through the passage 116 in the valve body 102 to the pipe or tube 117 which leads to the cylinder 79. This cylinder is rendered air-tight by the piston rings 118, and by a cover 119, packing gland 120 and nut 121 for taking up on the same. Upon release of the pressure on the foot treadle 112 the spring 114 will pull the T-lever 109 upwardly, releasing the plunger 107, whereupon the coiled spring 11 will force the valve seat 106 against the flange 122, thus shutting off the air supply to the inlet valve. Thereupon the arm 123 of the T-lever will press against the plunger 124, opening the valve seat 125 against the tension of the coiled spring 126 and permitting the air in the cylinder 79 and air pipe or tube 117 to exhaust through the passage 127 in the valve body 101, into the chamber 128 in the exhaust valve body 130 and through the passage 129 to the outer air, whereupon the worktable, the air pressure in the cylinder 79 having been released, will drop to its normal lowered position.

The main valve body 101 is securely fastened to the frame of the machine by a bracket 131 and screws or bolts 132.

I believe that my novel arrangement of air control and the structure for carrying out the same, in such a machine, enabling the operator to control and work the heavy moving parts of the machine without the medium of mechanical linkage, is new, and I wish to claim the same broadly herein.

The operation of the present machine, with my novel improvements, will now be described. Sheet material 1 on a cutting sheet 2 having been assembled on the worktable 3 while the worktable is in normal lowered position, and the cutting knife, leader and shiftable head all having been set to the proper adjustments, the operator depresses the foot treadle 112 slightly. This pulls the T-lever 109 downwardly by the rod or wire 113, pressing the plunger 107 inwardly against the diaphragm 104, and also pushes the valve stem 105 outwardly against the tension of the coiled spring 111. This permits the passage of air from the pipe line 99 to and through the chamber 115, through the passage 116 and into the pipe line 117 and to the cylinder 79. The air pressure is sufficient to raise the piston 78 and the table 3 secured thereto, pressing the cutting sheet 1 against the form 4 and holding the same firmly thereagainst during the cutting operation. Simultaneously with the raising of the piston 78 and worktable 3, the piston tail rod 67 rises, moving through a guide bearing 133, and raises the bellcrank lever 65 by means of the turnbuckle 66. The turnbuckle 66 is connected to the piston tail rod by a hook 134 and the piston tail rod has a sliding member 135 which is normally in downward position as clearly shown in Figs. 1 and 2, which acts as a lock to hold the turnbuckle onto the piston tail rod. This locking member 135 may easily be raised and the turnbuckle disconnected when it is desired to set the knife, or the like. The bellcrank lever 65 forces the link 64 to the right, Fig. 1, oscillating the lever 63 on its pivot 136 and engages the driven member 60 of the clutch with the driving portion 137, thus putting in operation the chain 59 and operating the shiftable head, cutting knife, carriage, shiftable leader, etc. The driving member 137 of the clutch is in continuous operation, being rotated by a chain 138 connected to the clutch driving member by a sprocket 139 and driven by a motor 140 through a sprocket 141. The sprocket 139 is made greatly larger than the sprocket 141, at a ratio of approximately five to one, or any other desired ratio, so that the speed of rotation of the clutch driven member 60 will be relatively less than the speed of rotation of the motor 140, which is desirable for efficient operation.

Upon completion of the cutting action, the operator releases the foot treadle 112, whereupon the spring 114 will pull the T-lever 109 upwardly, releasing the plunger 107 and the spring 111 will close the valve seat 106 against the flange 122. Simultaneously the plunger 124 is forced inwardly, opening the valve seat 125 and permitting the air in the pipe line and cylinder to exhaust into the open air, and the machine is then ready to perform another cutting action.

My present machine, operable as it is, by air pressure, instead of relying on the strength of the operator, and maintaining an even pressure throughout the entire day, produces more soles, and better soles, than the machines heretofore in use. The operator is not subjected to any tiring strains, and is enabled to operate the machine as efficiently at the close of the day as at the beginning. This is impossible when depending on the operator to provide the necessary power to lift the table, stock, cutting sheet, and also exert sufficient power to maintain the necessary pressure or friction to give the power and speed required, as well as the additional step of engaging the clutch for each cutting operation.

My invention is further described and defined in the form of claims as follows:

1. In a machine of the kind described, a truck, a reciprocable knife carrying carriage provided with a plurality of pairs of vertical anti-friction rolls and a plurality of horizontal anti-friction rolls, guideways in said truck, said vertical and horizontal rolls working in said guideways, and means to adjust said plurality of pairs of vertical rolls in opposite directions to compensate for wear.

2. In a machine of the kind described, a form, a worktable, a knife, manually controlled automatically operable means for raising the worktable relative to the form, means for moving the knife around the form, said means being controlled by the worktable during its movements, and power driven devices for operating the machine.

3. In a machine of the kind described, a form, a worktable fixed to an air controlled piston, a knife, manually controlled means for admitting air under pressure to the cylinder containing said piston for raising the worktable relative to the form, and means for moving the knife around the form, said means being brought into operation by the raising of the piston.

4. In a machine of the kind described, a form, a worktable fixed to an air controlled piston, a knife, manually controlled means for admitting air under pressure to the cylinder containing said piston for raising the worktable relative to the form, and means for moving the knife around the form, said means being brought into operation through a series of links and levers detachably connected to the tail rod of said piston and controlled by the raising thereof.

5. In a machine of the kind described, a form, a worktable fixed to a piston, a cylinder for said piston, a single foot treadle, an air valve having an inlet port leading to said cylinder and operable, upon depression of said foot treadle, to admit air to the cylinder and raise said piston and worktable, a knife, means for moving the knife around the form, and means detachably connected to said piston for controlling the knife moving means.

6. In a machine of the kind described, a form, a worktable fixed to a piston, a cylinder for said piston, a single foot treadle, an air valve having an inlet port leading to said cylinder and operable, upon depression of said foot treadle, to admit air to the cylinder and raise said piston and worktable, a knife, means for moving the knife around the form, means detachably connected to said piston for controlling the knife moving means, and an exhaust port in said valve automatically operable upon release of said foot treadle to exhaust the air from said cylinder and permit dropping of said piston and worktable and stoppage of the knife moving means.

7. A machine of the kind described, comprising a worktable, a form, a leader spaced above the form, a knife whose movement is governed by the leader, means for moving the knife around the form, said means including a truck confined to follow a predetermined path, a reciprocable knife-carrying carriage mounted in guideways in said truck and provided with vertical and horizontal rolls, means to adjust said vertical rolls to compensate for wear, said horizontal rolls permitting relatively free reciprocation of the knife-carrying carriage, a shiftable head provided with a guiding groove for said truck, a guiding member on said truck arranged to travel in said groove, a plate supported in spaced relation from the shiftable head, a pair of rolls on said truck bearing against the upper and lower surfaces of said plate for confining the rolls against displacement, means for adjusting said rolls, said worktable being attached to a piston, a cylinder for said piston, a foot treadle, an inlet valve leading to said cylinder and operable, upon depression of said foot treadle, to admit air to said cylinder and raise said piston and worktable, means detachably connected to said piston and arranged, upon raising of the piston, to engage a power driven clutch to operate the knife, the knife moving means and the shiftable head, and an exhaust port in said valve automatically operable upon release of said foot treadle to exhaust the air from said cylinder and permit dropping of said piston and worktable and simultaneous stoppage of the operation of the machine.

In testimony whereof, I have signed my name to this specification.

PETER J. McGOWAN.